(No Model.)
T. J. PERRIN.
MULTIPLE SWITCH BOARD.
No. 315,332. Patented Apr. 7, 1885.
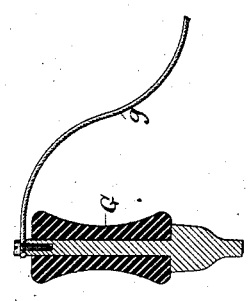
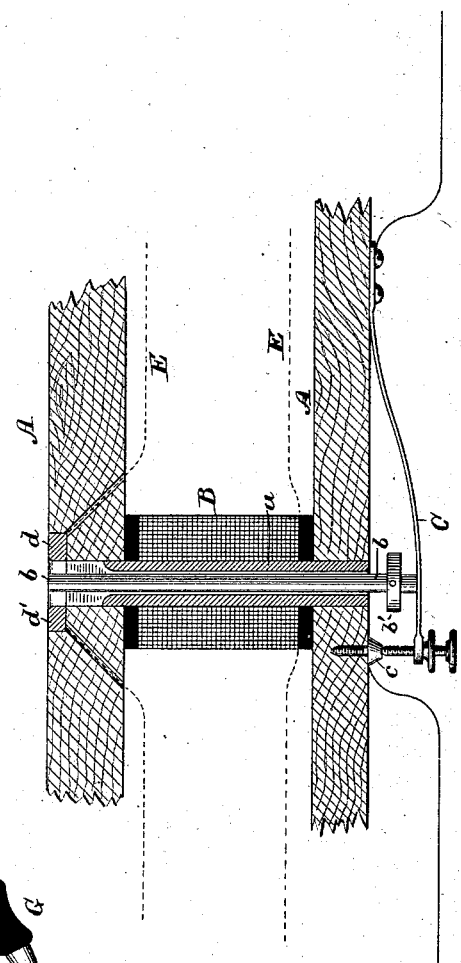
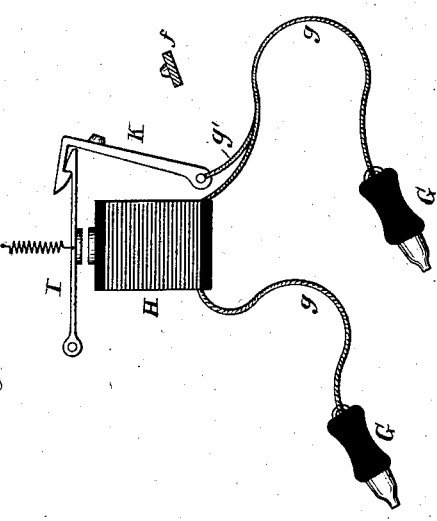
WITNESSES
INVENTOR
Thomas J. Perrin.
By his Attorneys

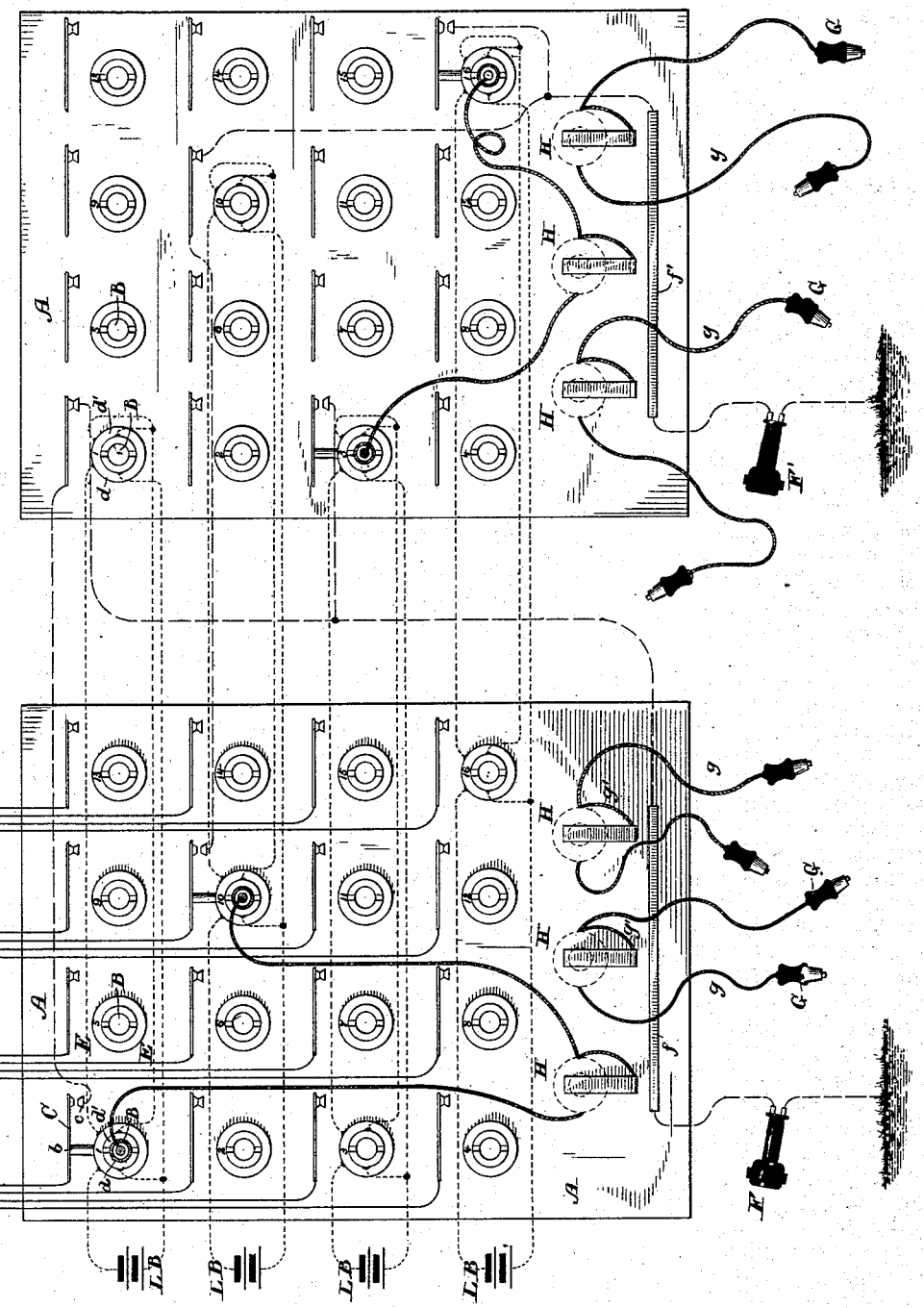

UNITED STATES PATENT OFFICE.

THOMAS J. PERRIN, OF BROOKLYN, ASSIGNOR TO CHARLES P. HUNTINGTON, OF NEW YORK, N. Y.

MULTIPLE SWITCH-BOARD.

SPECIFICATION forming part of Letters Patent No. 315,332, dated April 7, 1885.

Application filed September 30, 1884. (No model.)

*To all whom it may concern:*

Be it known that I, THOMAS J. PERRIN, of Brooklyn, in the county of Kings and State of New York, have invented certain new and useful Improvements in Multiple Switch-Boards for Telephone-Exchange Systems, of which the following is a specification.

The object of my invention is to provide a novel indicator for each line at each board to show the operator when the lines are in use.

The particular arrangements of the terminals of the main line and the local circuits and their terminals and magnets herein shown are claimed in application No. 135,996, filed by me June 25, 1884, and are here shown and described as one way of accomplishing the purpose of my present invention.

By means of my present improvement a visual indicator at each board at once indicates to the operators when any particular line is in use, and when communication over that line has ceased and it is disconnected the indicators at once return to their normal positions, thus indicating that the line is again idle. The indicators at the several boards may also be magnetized whenever the line is in use, and the operators, in addition to the visual indication, may test the magnetic condition of the indicators, if desired, though such an operation would never be necessary, except perhaps in case one of the indicators at a board should fail to operate and continued to indicate that the line was in use for an unusually prolonged period. Then the operator could test it to ascertain the condition of its local circuit and learn whether the main line was in use or not.

In the accompanying drawings, Figure 1 is a sectional view showing one of the board-terminals of a main line. Fig. 2 is a diagram view showing two boards connected according to my system, and Fig. 3 a detail view of the clearing-out annunciator.

The main-line terminals are organized as shown in Fig. 1. An electro-magnet, B, having a fixed hollow core, $a$, is suitably secured in the frame A A, and within the core $a$ is arranged an endwise-moving spindle, $b$, provided at the rear with an annular armature, $b'$, on which the core $a$ acts. A contact-spring, C, on the rear of the board A, normally bears on a contact-stud, $c$. The main line is connected with the spring and stud, so that when they are in contact the line-circuit is completed at that point, and from thence through the operator's telephone and other appliances, as fully explained below. The local circuit E of each set of line-terminals includes the coil of the magnets B and a local battery, L B. The terminals $d$ $d'$ of the line E at each of the main-line terminals on the boards are set in the face of the board out of electrical connection, as clearly shown in the drawings. The main-line connections are shown in Fig. 2 at 1 and 10. The circuit of line 1 is from line to spring and stud at terminal 1, board X, to spring and stud at terminal 1, board Y, and thence, through contact-strip $f$ and operator's telephone F at X, to earth. The connections of line 10 are made in the same way through contact $f'$ and operator's telephone F' at board Y. An illustration and description of these two lines are sufficient, as all the others are similarly connected. The connections of the local E of the terminals of each line are clearly shown in Fig. 2. For instance, referring to line No. 1, the local circuit runs from battery, the coils of magnets B at boards X and Y, thence to the terminals $d$ $d'$ in both boards and opposite pole of the battery. The circuit is normally open, but may be completed at either board by connecting the terminals $d$ $d'$.

Metallic switch-plugs G—such, for instance, as shown in Fig. 1—are provided to plug to a line-terminal when a call is received. These plugs are connected by conductors $g$, each pair being connected through the coil of one of a series of clearing-out annunciators, H, as clearly shown in Fig. 2. A branch, $g'$, from the conducting-cord $g$ is connected with the latch K of the armature I of the annunciator, which latch, when released by the attraction of the armature, falls upon and makes contact with one of the strips $f$ or $f'$, and establishes a branch circuit from the cord $g$ through the operator's instrument to earth.

Suppose that subscriber No. 1 desires to communicate with No. 10. He signals the operator at X through his instrument F, and the operator examines the terminal of line 10 to see if the line is in use. If the spindle $b$ is projecting, the operator knows that one of the terminals of line 10 has been plugged on some other board, thus completing the local E of that line and energizing the magnets B so that their cores $a$ attract the armature $b'$ and cause the spindle $b$ to project from the face of the board. If, however, he finds that the line is not in use, he proceeds to call subscriber No. 10 by sending a signaling-current into his line.

The connection between subscribers 1 and 10 is then made by the plugs G and cord $g$, as shown in Fig. 2 at X. When the plugs are inserted, they break the line at C $c$ by the thrust of the spindle $b$ and close the local at $d\ d'$. The main circuit is then from line 1 to spring C, rod or spindle $b$, through plugs G and cord $g$ to rod $b$ at No. 10 to line 10. When the subscribers have finished, one of them sends a current of sufficient strength over the line to energize the annunciator H, which attracts its armature and releases the latch K, which falls on the contact-strip $f$ and completes a circuit through the operator's instrument, who is informed that he may disconnect the lines. Ordinarily the drop of the latch would be sufficient notice to the operator. When the plug G is removed from the line-terminal, the local E of that line will be opened and the magnets B de-energized. In order, now, to have the spindles $b$ return to their normal position without the use of springs or other devices, I place the board in a horizontal position, or at such an inclination that the spindles will drop back by gravity. The spindles may, of course, be made of any suitable material, but soft-iron ones should be employed when it is desired that the magnetic condition of the spindle shall serve as a test of the condition of the line.

I claim as my invention—

1. The combination, in a multiple switch-board, of a series of main lines, the terminal or connection where each of said main lines enters each switch-board, and a visual-indicator at each of said terminals or connections on each board, the visual-indicators of each line being automatically operated on all the boards whenever any terminal of said line is plugged.

2. The combination, in a multiple switch-board, of a series of main lines, the connections of each of said main lines on each switch-board, the local circuit for each main line running to each of said connections, the electro-magnets in said local circuit, and the endwise-moving spindle in the core of said magnet, which is projected from the face of the board whenever said local circuit is completed.

3. The combination, in a muitiple switch-board, of the main lines, the connections of each main line with each board, an electro-magnet having a hollow core at each of said connections, a local circuit for each main line, which includes the coils of said magnets, the endwise-moving spindles within the hollow cores of said magnets, the armatures carried by the spindles, and the local-circuit terminals at each magnet.

4. In a multiple switch-board, the combination of an electro-magnetic coil at each main line connection on said board, an endwise-moving spindle or core within each of said coils, and means, substantially such as described, for causing the projection of the cores from the faces of the boards whenever its corresponding main line is in use.

In testimony whereof I have hereunto subscribed my name.

THOMAS J. PERRIN.

Witnesses:
L. C. YOUNG,
NELLIE L. HOLMES.